BALL-TYPE SURFACE SAFETY VALVE
Filed April 13, 1959 4 Sheets-Sheet 1
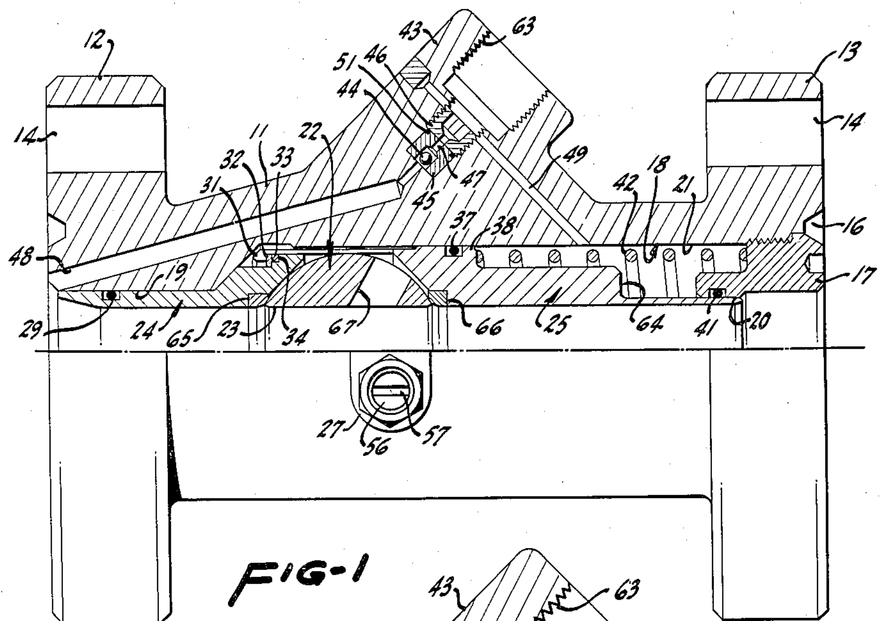
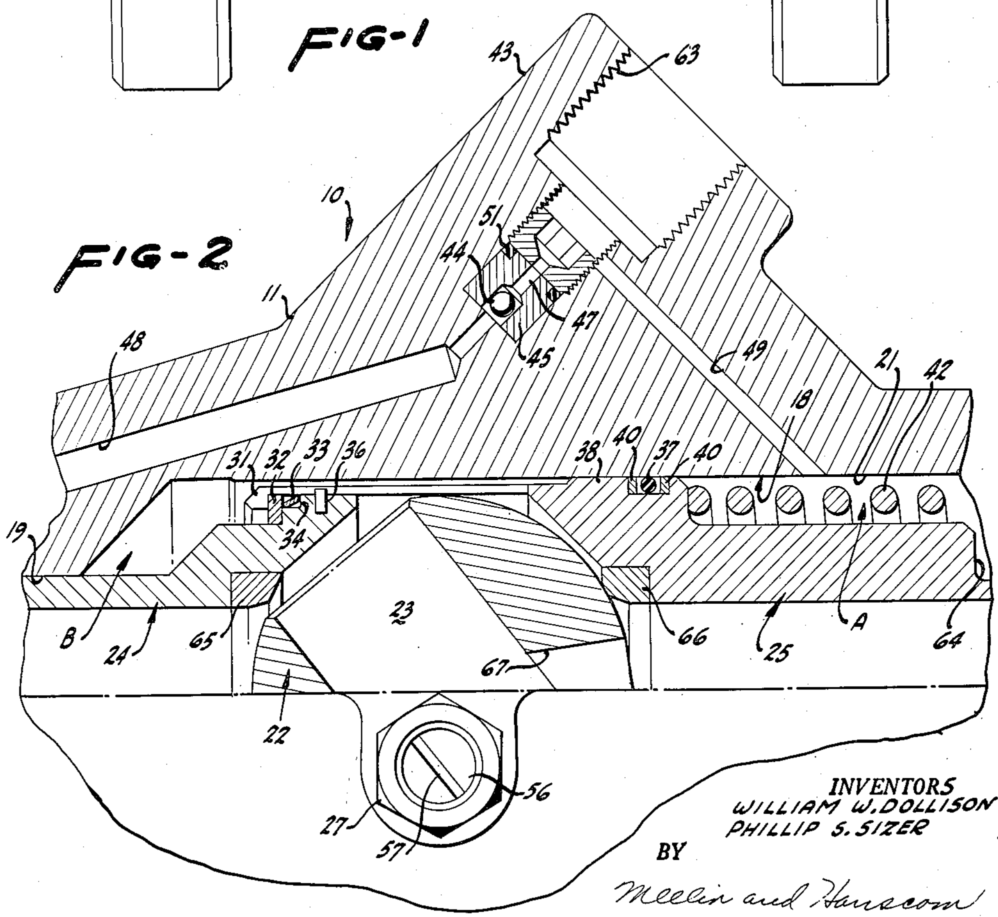
INVENTORS
WILLIAM W. DOLLISON
PHILLIP S. SIZER
BY
Mellin and Hanscom
ATTORNEYS Feb. 28, 1961 W. W. DOLLISON ET AL 2,973,005
BALL-TYPE SURFACE SAFETY VALVE
Filed April 13, 1959 4 Sheets-Sheet 2
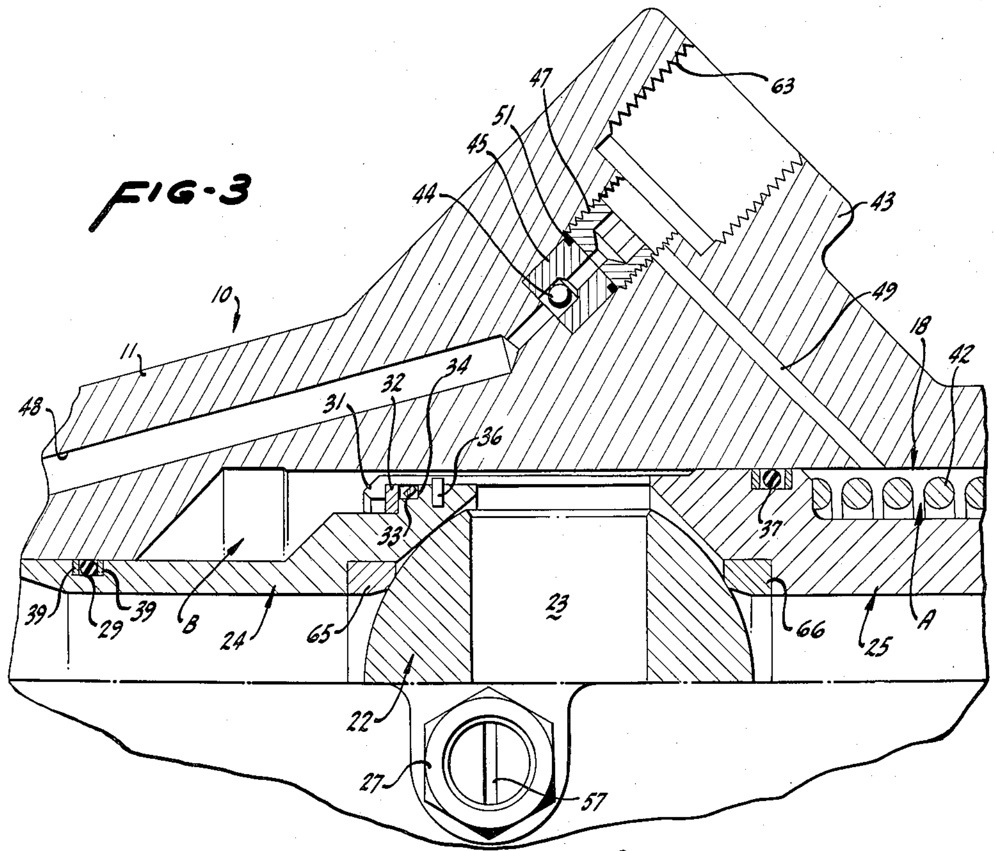
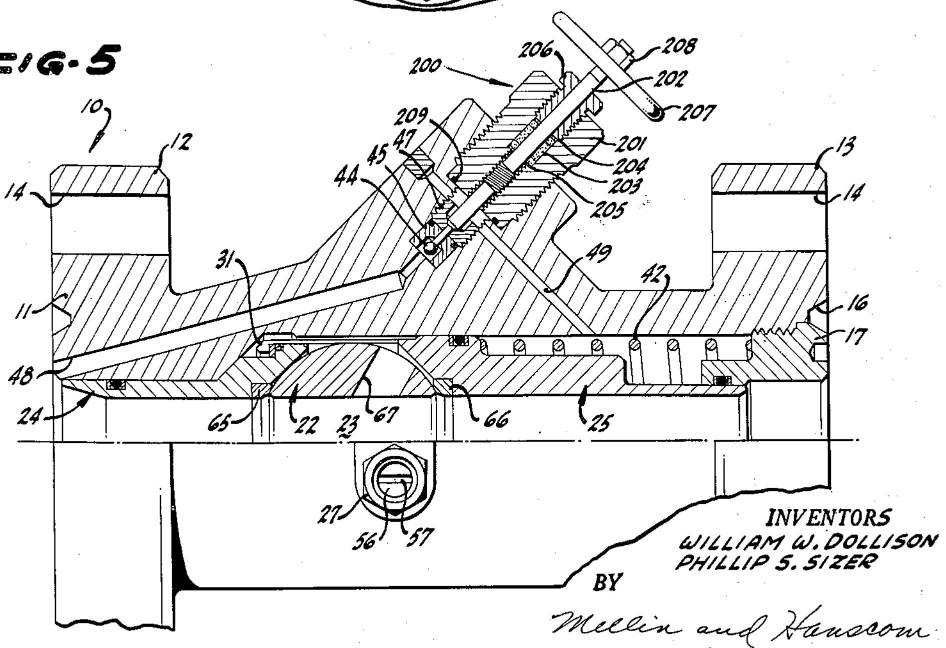
INVENTORS
WILLIAM W. DOLLISON
PHILLIP S. SIZER
BY
Mellin and Hanscom
ATTORNEYS Feb. 28, 1961 W. W. DOLLISON ET AL 2,973,005
BALL-TYPE SURFACE SAFETY VALVE
Filed April 13, 1959 4 Sheets-Sheet 3
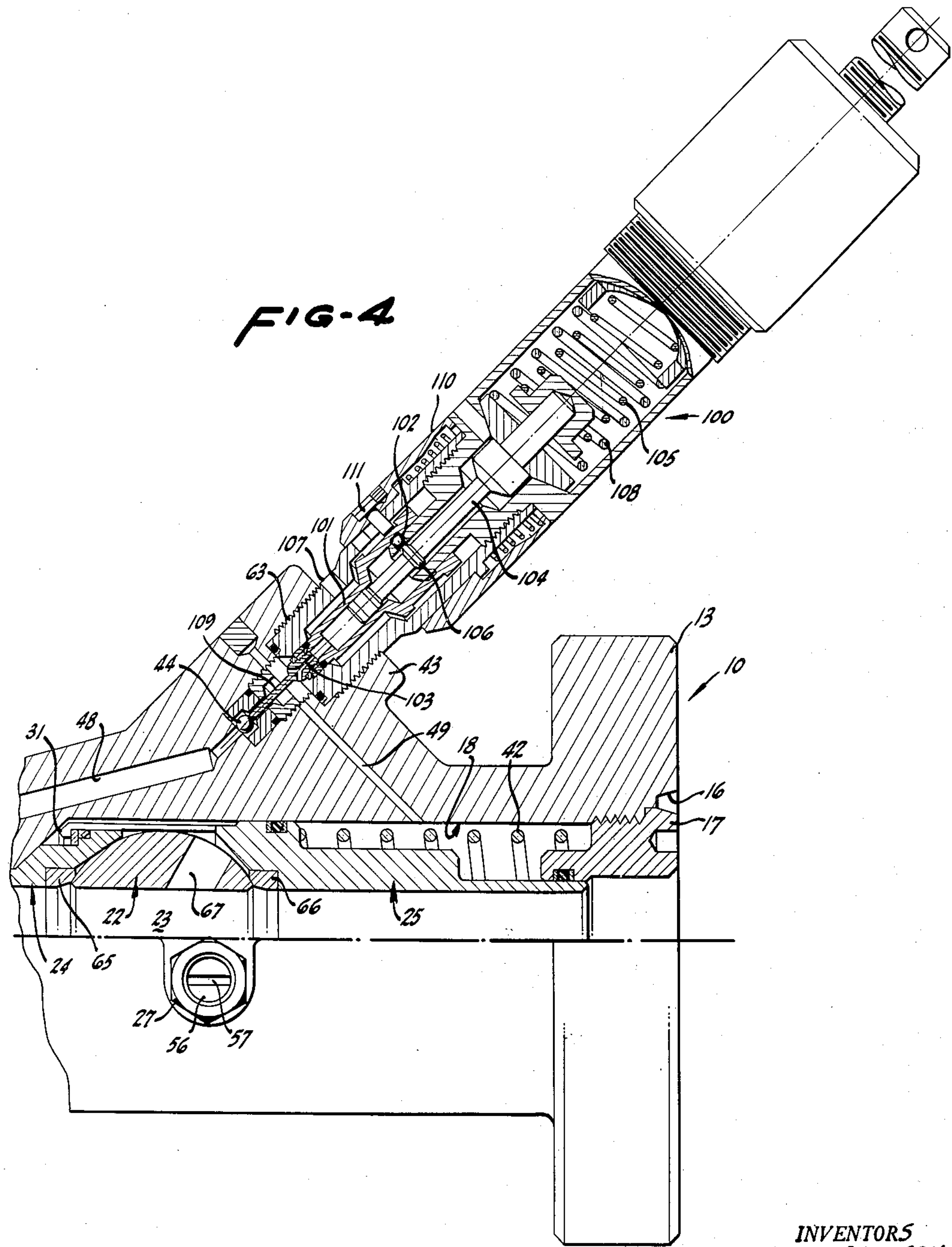
INVENTORS
WILLIAM W. DOLLISON
PHILLIP S. SIZER
BY
Mellin and Hanscom
ATTORNEYS

BALL-TYPE SURFACE SAFETY VALVE

INVENTORS
WILLIAM W. DOLLISON
PHILLIP S. SIZER
BY
Mellin and Hanscom
ATTORNEYS

United States Patent Office 2,973,005

Patented Feb. 28, 1961

2,973,005

BALL-TYPE SURFACE SAFETY VALVE

William W. Dollison and Phillip S. Sizer, Dallas, Tex., assignors to Otis Engineering Corporation, Dallas, Tex., a corporation of Texas Filed Apr. 13, 1959, Ser. No. 805,919

12 Claims. (Cl. 137—458)

This invention relates to valves, and more particularly to ball-type valves having a straight full bore opening therethrough and usable as a pressure-responsive control valve.

Automatically actuated, pressure-responsive control valves have been used in the oil industry for many years. These valves, due to their construction, have not been altogether satisfactory since paraffin, sand or other substances in the well fluids tended to deposit themeselves in the working parts of the valve mechanism or in the narrow passageways therein and interfere with the valve's functioning. Also, in those valves not having a straight-through bore, paraffin or other substances present in the well fluids would sometimes adhere to the inner walls of the valve's flow passage and restrict same, causing a drop in pressure across the valve often sufficient to cause premature or unintentional closing of the valve, or abrasive particles in the well fluids tended to erode the valve parts beyond usefulness. Valves having a straight-through and unrestricted bore have been large and expensive.

The present invention provides a pressure-responsive control valve which is small, compact and inexpensive, yet contains a straight-through flow passage and utilizes a spherical valve member which is more dependable in its operation.

The improved surface safety valve of this invention is particularly suitable for use with the pilot valve shown in application Serial No. 696,708, for a Balanced Pilot Valve, filed November 15, 1957, and now Patent No. 2,902,046, by W. W. Dollison, a co-inventor of the present invention. However other commercial pilot valves may be used, singly or in combination, as circumstances dictate. Also, this valve can be operated manually or can be used as a motor valve.

A ball valve similar to the present invention is described in pending patent application serial No. 755,671, filed August 18, 1958, and now Patent No. 2,959,187, by William G. Boyle, for a "Ball-Type Surface Safety Valve." The device of Boyle's invention has an undesirable operating characteristic in that it opens so rapidly as to be dangerous. In the present invention, this drawback has been overcome, as will be hereinafter pointed out. At the same time, the device of the present invention is simpler in its structure, operation, and the procedure required to manipulate it.

The main object of the invention is to provide a ball-type surface safety valve having a straight unrestricted bore therethrough which is operated between open and closed positions by the pressure of the fluid upstream of said valve.

A further object of the invention is to provide a valve having the above characteristics in which the valve opens slowly to minimize injurious wear and tear on the valve parts.

Another object of the invention is to provide a valve having the above characteristics in which the valve may move from open to closed positions in response to pressure variations in the fluid upstream of said valve.

A yet further object is to provide a ball-type valve with an external indicator to indicate visually whether the valve is in open or closed position.

Other objects and advantages will become apparent in the course of the following detailed description.

In the drawings, forming a part of this application, and in which like parts are designated by like reference numerals throughout the same, Fig. 1 is an elevational view, partly in section, of a ball-type surface safety valve constructed in accordance with the invention, and showing the relationship of the valve parts when the valve is in open position.

Fig. 2 is a partial view, similar to Fig. 1, illustrating the relationship of the valve parts when the valve is partially open.

Fig. 3 is similar to Figs. 1 and 2 and illustrates the valve in closed position.

Fig. 4 is a sectional view illustrating the use of a pilot valve in controlling the operation of the valve depicted in Fig. 1.

Fig. 5 is a sectional view illustrating the use of a manually operable control means for controlling the operation of the valve depicted in Fig. 1.

Figure 6:
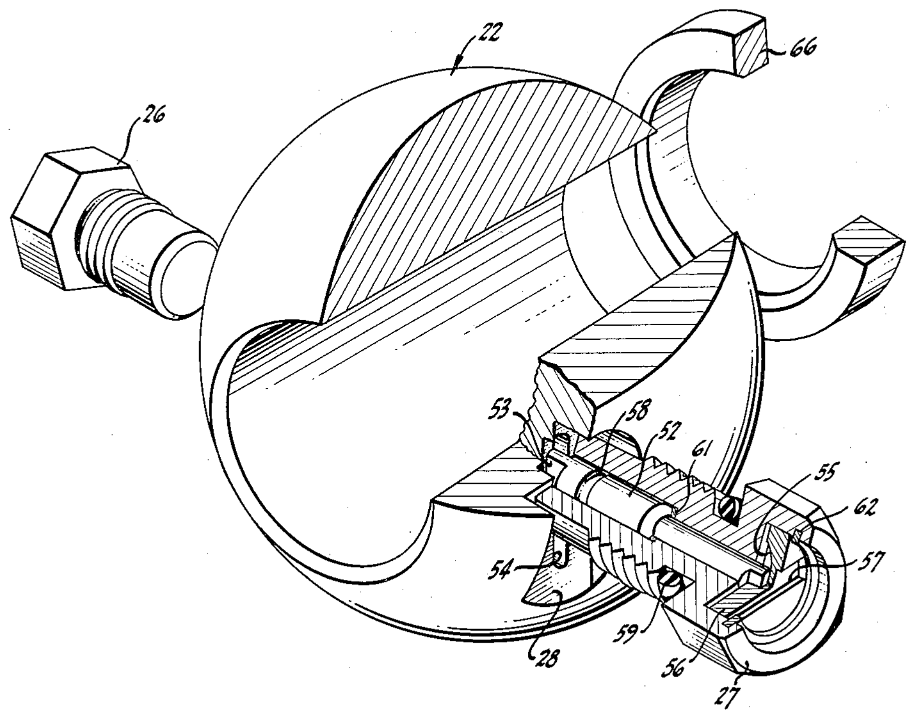
Fig. 6 is a perspective view, with parts cut away to illustrate the details of the ball-valve position-indicating device.

Referring now to the drawings, and in particular to Figs. 1, 2 and 3, the ball-type surface safety valve indicated generally by the reference numeral 10, is comprised, essentially, of a body 11 having upstream and downstream flanges 12 and 13, respectively, and bolt holes 14 therethrough for attachment to a well head or well flow-line (not illustrated). The end faces of the valve body are provided with grooves 16 which are adapted to receive standard seal rings. Annular nut 17 is threaded into the downstream end of body 11. The valve body has a straight bore 18 therethrough having upstream and downstream restricted diameter portions 19 and 20 on either side of an enlarged diameter mid-portion 21. The restricted diameter bore end 20 is formed by the bore through nut 17. Within the bore 18, a rotatable ball-valve member 22 having a main bore 23 therethrough, an upstream valve seat member 24, and a spring-loaded downstream valve seat member 25 are mounted for longitudinal sliding movement between an open position, as shown in Fig. 1, and a closed position, shown in Fig. 3.

Cam lugs 26 and 27 (Fig. 6), mounted in the wall of valve body 11 and projecting inwardly therefrom, engage blind cam slots 28 formed in opposite sides of the ball valve and force the valve to rotate about an axis transverse to the opening 23 therethrough as it is moved longitudinally from the open to the closed position and vice versa.

Downstream seat 25 is provided with a plurality of collet fingers 31 which are integral therewith and which extend to the left in Fig. 1 beyond ball valve 22 to engage behind the shoulder of spring washer 32, located about upstream seat 24. Thus the ball valve is enclosed between the upstream and downstream seats and is compelled to move longitudinally as said seats move; however, as it moves longitudinally, it will simultaneously rotate due to resistance offered by stationary cam lugs 26 and 27 which are mounted slightly below the center line of the ball. Wave spring 33 is disposed between spring washer 32 and shoulder 34 to bias the upstream and downstream seats toward one another and, therefore, maintain intimate contact with the ball valve. Pin 36 projects outwardly from the upstream seat and between the collet fingers 31 for the purpose of keeping the upstream seat properly aligned with the downstream seat and, therefore, with cam lugs 26 and 27. O-ring 37, between back-up rings 40, is disposed in a groove cut in the outwardly extending annular flange portion 38 of downstream seat 25 to seal between the downstream seat and the mid-portion 21 of the valve body bore. Upstream seat 24 has a groove formed in the outer surface of its reduced portion which contains O-ring 29, placed between two back-up rings 39 for the purpose of sealing between the upstream seat and the restricted upstream end 19 of the bore 18.

Similarly, the downstream seat 25 is sealed by O-ring 41 to the restricted downstream end 20 of bore 18. The downstream seat 25 and the valve body bore form therebetween a sealed variable-capacity chamber A.

Spring 42 is disposed in chamber A and serves to bias the downstream seat in an upstream direction towards the open position. The annular nut 17 is threaded into the downstream end of the bore 18 to close the downstream end of chamber A to support spring 42, to support the lower end of the downstream seat 25 and to limit the movement of the downstream seat so that the valve parts will be properly stopped in their closed position.

Within pilot boss 43, a check valve, composed of ball 44, seat 45, and seat retainer 46, is mounted so that bore 47 connects with passageway 48, which extends from the upstream end of body 11 to bore 47, and with passageway 49, extending from bore 47 to chamber A, to make continuous a series of passageways for conducting pressure from upstream of the ball valve to chamber A. When chamber A is vented to the atmosphere through passageway 49, ball 44 prevents the escape of well fluids through bore 47 while O-ring 51 seals around seat 45. When upstream pressure exists in chamber A, in normal operation, the pressure forces on the valve parts 22, 24 and 25 are equalized, and spring 42 will hold these parts in the open position as shown in Fig. 1.

Built into cam lug 27 is an indicator which shows the position of ball valve 22 at all times, whether it is open or closed. Referring to Fig. 6, cam lug 27 is bored to accept indicator rod 52 which is flattened at either end, its inner end 53 engaging groove 54 formed in cam slot 28 of the ball and its outer end engaging slot 55 in the under side of indicator 56. Thus, as ball 22 rotates, indicator 56 will turn also. Groove 57 is provided on the front face of the indicator and is so oriented that said groove is always parallel with bore 23 of the ball and will therefore denote the ball's position. O-ring 58 seals between indicator rod 52 and the inner wall of cam lug 27, while O-ring 59 seals around the outside of the cam lug. Washer 61 is disposed about indicator rod 52 to act as a thrust bearing and make the rod easier to turn. Indicator 56 is retained in the counterbore of cam lug 27 by a spiral retainer ring 62.

Fig. 4 illustrates the use of a balanced pilot valve 100 connected into the pilot valve boss 43 to control the operation of the valve 10. The pilot valve 100 is identical in operation to that fully illustrated and described in the above referred to Dollison patent.

For the purpose of the present disclosure, it is sufficient to state that the pilot valve 100 has a valve member 101 therein which is locked against longitudinal movement by locking balls 102. The upstream pressure is exerted through passage 103 in the valve member 101 to force against plunger 104, which is normally biased in opposition thereto by spring 105. Plunger 104 has a flange 106 thereon to hold the locking balls 102 outwardly in locked engagement with the valve member 101.

If the upstream pressure exerted within valve member 101 on plunger 104 falls below a predetermined value, spring 105 will force the plunger to move to the left, moving the flange away from the locking balls, allowing the valve member 101 to become unlocked. The upstream pressure then forces the valve member 101 to the right, allowing the upstream pressure to vent through opening 107 to atmosphere.

If the upstream pressure, exerted within valve member 101 on plunger 104, irses above a predetermined value, the plunger 104 will move to the right against the force of both springs 105 and 108, again unlocking the valve member so that it may move to the right to vent the upstream pressure to atmosphere.

The pilot valve 100 has been modified for use in the present invention by the provision of a stub member 109 on the valve member 101 which projects through the check valve seat 45 to unseat the ball 44 when the pilot valve member 101 is locked in its closed position. When the pilot valve member 101 moves to open position, the stub 109 will move therewith, allowing the check valve 44 to seat on the check valve seat 45.

The pilot valve 100 may be reset to closed position by forcing the sleeve 110 to the left, which causes reset pin 111 to move the pilot valve member 101 to the left so that the locking balls may lock the pilot valve member closed.

Under normal operating conditions, spring 42 maintains the ball 22 and its upstream and downstream seats 24 and 25, respectively, in their open position. The safety valve pilot 100 connected at thread 63 prevents the escape of well fluids through pilot boss 43. Check valve ball 44 is held off its seat 45 by the stub 109 projecting from the pilot valve member 101 so that chamber A is in communication with the upstream end of the bore of body 11 through passageways 48, 47, and 49.

When, for any reason, the pilot valve 100 operates, it vents chamber A to the atmosphere through passage 49. At the same time, pilot stub 109 is retracted, and upstream pressure attempting to escape through passage 47 forces check ball 44 against its seat 45 and prevents well fluids from escaping through passage 48.

The evacuation of fluid pressure from chamber A creates a thrust against the cross-sectional area defined by the difference in the areas sealed by O-rings 41 and 37, and moves the downstream seat 25 to the right in Fig. 1, further compressing spring 42, until shoulder 64 of the downstream seat contacts the upstream face of the nut 17 and the valve parts come to rest in their closed position as shown in Fig. 3. As the downstream seat 25 moves to the right, its collet fingers 31 pull upstream seat 24 to the right also; and since ball 22 is confined between these seats, being held in close contact therewith by wave spring 33, it, too, is moved to the right. As the ball moves to the right, it is forced to rotate 90 degrees by reason of the cam lugs 26 and 27 (Fig. 6) engaging in the cam slots 28 thereof. After turning 90 degrees, the bore 23 of the ball is crosswise of the main body bore 18 and the flow of well fluids through the valve is prevented. When the ball 22 is in its closed position, upstream pressure forces the hardened upstream seat portion 65 firmly thereagainst, as shown in Fig. 3, and effects a seal. Downstream seat 25 is provided with a cast iron insert 66 to reduce friction between it and the ball 22. O-ring 29 seals the interface between the upstream seat 24 and the body 11, and the back-up rings 39 prevent the extrusion of the O-ring.

The indicator 56, provided in cam lug 27, rotates with the ball 22, since the flattened inner and outer ends of rod 52 are engaged in groove 54 of the ball and slot 55 of the indicator, respectively, and will, when the valve is closed, display groove 57 thereon, which is always parallel to the ball valve bore 23, at 90 degrees to the longitudinal axis of the valve. (When the valve is open, this groove is parallel to the axis of the valve.)

The valve 10 will remain closed until the pressure of chamber A is equalized with that existing upstream of the valve, or thereabout.

The ball valve 22 is provided with an auxiliary bore 67 extending from the main bore 23 thereof to the downstream side of the ball valve 22 when the ball valve is closed as in Fig. 3. Thus downstream pressure exists in the bore of the downstream valve seat member 25 and in chamber B around the ball valve 25 and between the valve seat members 24 and 25.

When the valve is closed, upstream pressure exists in the bore of the upstream valve seat member 24 and in passage 48, atmospheric pressure exists in chamber A, the downstream pressure exists in chamber B, and the full pressure differential between upstream and downstream pressures will appear across the valve seat portion 65. The ball valve will be forced against the downstream seat 25 by a force equal to this pressure differential multiplied by the area of the circle described by the contact between the upstream seat and the ball. In addition, the ball will be forced against the downstream seat with a force equal to the force of the upstream seat against the ball, which equals the above pressure differential multiplied by the effective annular area between the restricted bore end 19 and the circle described by the contact between the upstream seat and the ball. As is apparent from this, the total thrust of the ball against the downstream valve seat member 25 is equal to the pressure differential multiplied by the cross-sectional area of the restricted bore end 19.

When chamber A is recharged with upstream pressure, a thrust tending to open the valve is created. This thrust is equal to the differential pressure multiplied by the annular area defined by the difference in the areas sealed by O-rings 37 and 41.

These opposing thrusts tend to squeeze the ball between its seats and create friction with the friction thus created being directly proportional to the existing pressure differential.

In order to overcome this friction and open the valve by re-charging chamber A with upstream pressure, the annular cross-sectional area between the bore mid-portion 21 and the restricted downstream bore end 20 should be substantially larger than the cross-sectional area of the restricted upstream bore end 19.

Since the bulk of the friction is created by the pressure differential, if the pressure differential decreases as the valve opens the friction will decrease proportionately and simultaneously, which will prevent the valve from opening with violence.

In re-opening the valve, check valve 44 is forced from its seat 45, permitting upstream pressure to re-enter chamber A. The upstream pressure in chamber A, being greater than the downstream pressure in chamber B, with the help of spring 42, moves the valve parts upstream toward the open position. When ball 22 has turned sufficiently to permit well fluids to commence flowing therethrough, chamber B tends to become charged with upstream pressure which would offset the thrust resulting from upstream pressure in chamber A. To alleviate this undesirable effect, the auxiliary bore 67 in ball valve 22 serves to equalize the pressure in chamber B with that existing in the downstream seat bore and thereby maintains a differential pressure between chambers A and B across chamber A so that the valve parts will move on to their open position. Were it not for the auxiliary ball-valve bore 67, the pressure within chamber B would approach that existing in chamber A. Since this would minimize the differential pressure across the area defined by the difference in the areas sealed by O-rings 37 and 41, and since spring 42 is not sufficiently powerful to overcome the pressure differential across the ball itself, the valve would remain as shown in Fig. 2 until the pressures upstream and downstream of the valve were equalized, or thereabout. Without the auxiliary bore 67, spring 42 would have to be much stronger, depending upon the difference in upstream and downstream pressures which, in many installations, might be quite high. High differentials would require such great strength and size in spring 42 that it would be quite impractical to take this approach since the outside diameter of body 11 and the inside diameter of bore 18 are limiting factors. Also, to increase the load of spring 42 would be to increase, accordingly, the minimum pressure at which this device would operate and would, therefore, render it unsuitable for many low pressure installations, unless lighter springs were available for such cases. It may be seen, then, that a variety of springs might be required and that this device would not be at all practical where high pressure differentials were likely unless auxiliary bore 67 is provided.

One or more additional pilot bosses 43 may be provided and can be equipped with connections or manifolds to accept any number of additional pilot valves. These additional bosses need not be provided with check valves as is pilot boss 43 since their bores would not be required to communicate with pressure upstream of the valve, but need communicate only with chamber A through passageways identical to passageway 49. Use of pilots in other bosses might necessitate the use of a manual control means 200 in pilot boss 43 of the type shown in Fig. 5. This manual control means 200 is comprised of a body 201 bored and threaded to receive stem 202 for unseating the ball, packing 203 for sealing between the stem and body, upper and lower washers 204 and 205, respectively, to prevent extrusion of the packing, and gland 206 for introducing compression upon the packing 203. Handle 207 is attached to the upper end of the stem and is secured with nut 208. Turning of handle 207 results in stem 202 being moved inwardly or outwardly, depending upon the direction of rotation. O-ring 209 is provided to seal between the lower end of control body 201 and valve body 11.

During normal operations, stem 202 is positioned outwardly sufficiently to allow room for check valve ball 44 to seal against its seat should a pilot valve vent chamber A to the atmosphere.

In opening the safety valve, handle 207 is turned clockwise until check valve ball 44 is unseated to permit upstream pressure to charge chamber A and open the safety valve.

The construction of the valve described above offers several advantages not offered by other surface safety valves.

Since a check valve 44 has been provided in the bypass in the wall of this valve, no communication port or ports are necessary in the downstream seat 25 through which flowline pressure would be supplied to chamber A. The absence of these ports prevents the collection of paraffin, sand, etc., from interfering with the pressure level in chamber A and, thus, prevents malfunctioning due to variations in this pressure.

It will also be noted that this valve has a straight-through flow passage which will discourage the deposition of paraffin or other foreign matter therein.

There is little likelihood that this valve will be closed by normal surges in the flow of well fluids since the main bore is uniform and unrestricted, and since the pilot valve mechanism will not be immediately responsive to such surges due to the relatively small diameters of passages 47 and 48.

Thus, even though a surge in the fluid might close or tend to close the ball valve by the force on the upstream valve seat member, the ball valve will immediately re-open since chamber A would still contain upstream pressure.

However, if the surge is abnormally great or sustained so as to cause the pilot valve mechanism to vent chamber A, the ball valve will be closed, as previously described.

As stated in the beginning, this valve can be used with any of a great variety of pilot valve mechanisms which act to vent chamber A to atmosphere and can be readily adapted to manual operation or can be used as a motor valve.

A distinct advantage offered by this improved valve is its simplicity of operation. For instance, after closing, the valve, when equipped with the pilot mechanism 100 shown in Fig. 4, may be re-opened merely by moving the sleeve 110 to the left; then, after normal conditions are restored, this sleeve is returned to its normal position.

Another advantage is that the indicator on this valve signifies at all times whether the valve is open or closed. It is quite practical to connect even remote indicators to this valve so that observations could be made from any distance therefrom.

It is to be understood that the form of the invention herewith shown and described is to be taken as a preferred embodiment of the same, and that various changes may be made in the shape, size and arrangement of parts without departing from the spirit of the invention or the scope of the attached claims.

Having thus described our invention, what we claim and desire to secure by Letters Patent is:

1. A ball-type surface safety valve comprising a valve body provided with a straight bore therethrough having upstream and downstream restricted diameter portions on either side of an enlarged diameter portion, a pair of upstream and downstream oppositely facing and spaced apart tubular valve seat members each longitudinally slidable in one of said bore end portions and projecting into said enlarged bore mid-portion, a ball-valve member having an opening therethrough and seatable between said seats for opening and closing said bore upon the rotation thereof about an axis transverse to the opening therethrough, interengaging cam slots on one and cam lugs on the other of the opposite sides of said ball-valve member and the valve body for causing rotation of said ball-valve member to closed position upon downstream longitudinal movement thereof in said bore and to open position upor upstream longitudinal movement thereof in said bore, connecting means coupling said valve seat members for unitary longitudinal movement thereof within said bore, an external annular flange formed on the downstream valve seat member in sliding engagement with said enlarged bore mid-portion to form a variable capacity chamber between the enlarged bore mid-portion and the downstream valve seat member, resilient means in said valve body biasing said downstream valve seat member in an upstream direction, means including a valve for selectively fluidly communicating said chamber to the upstream end of said bore or to atmosphere and passage means for fluidly communicating the enlarged bore mid-portion between said valve seat members with the downstream end of said bore at all times during opening and closing movement of said ball-valve member.

2. A ball-type surface safety valve comprising a valve body provided with a straight bore therethrough having upstream and downstream restricted diameter portions on either side of an enlarged diameter portion, a pair of upstream and downstream oppositely facing and spaced apart tubular valve seat members each longitudinally slidable in one of said bore end portions and projecting into said enlarged bore mid-portion, a ball-valve member having an opening therethrough and seatable between said seats for opening and closing said bore upon the rotation thereof about an axis transverse to the opening therethrough, interengaging cam slots on one and cam lugs on the other of the opposite sides of said ball-valve member and the valve body for causing rotation of said ball-valve member to closed position upon downstream longitudinal movement thereof in said bore and to open position upon upstream longitudinal movement thereof in said bore, connecting means coupling said valve seat members for unitary longitudinal movement thereof within said bore, an external annular flange formed on the downstream valve seat member in sliding engagement with said enlarged bore mid-portion to form a variable capacity chamber between the enlarged bore mid-portion and the downstream valve seat member, said chamber having a cross-sectional area greater than the cross-sectional area of the restricted upstream end of said bore, resilient means in said valve body biasing said downstream valve seat member in an upstream direction, means including a valve to selectively fluidly communicate said chamber to the upstream end of said bore or to atmosphere, and passage means through said ball-valve member for fluidly communicating the enlarged bore mid-portion between said valve seat members with the downstream end of said bore at all times during opening and closing movement of said ball-valve member.

3. A ball-type surface safety valve comprising a valve body provided with a straight bore therethrough having upstream and downstream restricted diameter portions on either side of an enlarged diameter portion, a pair of upstream and downstream oppositely facing and spaced apart tubular valve seat members each longitudinally sealingly slidable in one of said bore end portions and projecting into said enlarged bore mid-portion, a ball-valve member having an opening therethrough and seatable between said seats for opening and closing said bore upon the rotation thereof about an axis transverse to the opening therethrough, interengaging cam slots on one and cam lugs on the other of the opposite sides of said ball-valve member and the valve body for causing rotation of said ball-valve member to closed position upon downstream longitudinal movement thereof in said bore and to open position upon upstream longitudinal movement thereof in said bore, connecting means coupling said valve seat members loosely to said ball-valve member for unitary longitudinal movement thereof within said bore, an external annular flange formed on the downstream valve seat member and slidably and sealingly engaging said enlarged bore mid-portion to form a variable capacity chamber between the enlarged bore mid-portion and the downstream valve seat member, said chamber having a cross-sectional area substantially greater than the cross-sectional area of the restricted upstream end of said bore, means including a valve to selectively fluidly communicate said chamber to the upstream end of said bore or to atmosphere, spring means in said valve body biasing said downstream valve seat member in an upstream direction, and passage means fluidly communicating the enlarged bore mid-portion between said valve seat members with the downstream end of said bore at all times during opening and closing movement of said ball-valve member.

4. A ball-type surface safety valve comprising a valve body provided with a straight bore therethrough having upstream and downstream restricted diameter portions on either side of an enlarged diameter portion, a pair of upstream and downstream oppositely facing and spaced apart tubular valve seat members each longitudinally slidable in one of said bore end portions and projecting into said enlarged bore mid-portion, a ball-valve member having an opening therethrough and seatable between said seats for opening and closing said bore upon the rotation thereof about an axis transverse to the openings therethrough, interengaging cam slots on one and cam lugs on the other of the opposite sides of said ball-valve member and the valve body for causing rotation of said ball-valve member to closed position upon downstream longitudinal movement thereof in said bore and to open position upon upstream longitudinal movement thereof in said bore, connecting means coupling said valve seat members for unitary longitudinal movement thereof within said bore, an external annular flange formed on the downstream valve seat member in sliding engagement with said enlarged bore mid-portion to form a variable capacity chamber between the enlarged bore mid-portion and the downstream valve seat member, resilient means in said valve body biasing said downstream valve seat member in an upstream direction, a first passage in said valve body from said chamber to said bore upstream of said ball-valve member, a second passage in said valve body from said chamber to the exterior of said valve body, selectively operable valve means for simultaneously opening said first passage and closing said second passage or for simultaneously closing said first passage and opening said second passage, and third passage means fluidly communicating the enlarged bore mid-portion between said valve seat members with the downstream end of said bore at all times during opening and closing movement of said ball-valve member.

5. A ball-type surface safety valve comprising a valve body provided with a straight bore therethrough having upstream and downstream restricted diameter portions on either side of an enlarged diameter portion, a pair of upstream and downstream oppositely facing and spaced apart tubular valve seat members each longitudinally slidable in one of said bore end portions and projecting into said enlarged bore mid-portion, a ball-valve member having an opening therethrough and seatable between said seats for opening and closing said bore upon the rotation thereof about an axis transverse to the opening therethrough, interengaging cam slots on one and cam lugs on the other of the opposite sides of said ball-valve member and the valve body for causing rotation of said ball-valve member to closed position upon downstream longitudinal movement thereof in said bore and to open position upon upstream longitudinal movement thereof in said bore, connecting means coupling said valve seat members for unitary longitudinal movement thereof within said bore, an external annular flange formed on the downstream valve seat member in sliding engagement with said enlarged bore mid-portion to form a variable capacity chamber between the enlarged bore mid-portion and the downstream valve seat member, said chamber having a cross-sectional area substantially greater than the cross-sectional area of the restricted upstream end of said bore, spring means in said valve body biasing said downstream valve seat member in an upstream direction, a first passage in said valve body from said chamber to said bore upstream of said ball-valve member, a second passage in said valve body from said chamber to the exterior of said valve body, selectively operable valve means for simultaneously opening said first passage and closing said second passage or for simultaneously closing said first passage and opening said second passage, and third passage means fluidly communicating the enlarged bore mid-portion between said valve seat members with the downstream end of said bore at all times during opening and closing movement of said ball-valve member.

6. A ball-type surface safety valve comprising a valve body provided with a straight bore therethrough having upstream and downstream restricted diameter portions on either side of an enlarged diameter portion, a pair of upstream and downstream oppositely facing and spaced apart tubular valve seat members each longitudinally sealingly slidable in one of said bore end portions and projecting into said enlarged bore mid-portion, a ball-valve member having an opening therethrough and seatable between said seats for opening and closing said bore upon the rotation thereof about an axis transverse to the opening therethrough, interengaging cam slots on one and cam lugs on the other of the opposite sides of said ball-valve member and the valve body for causing rotation of said ball-valve member to closed position upon downstream longitudinal movement thereof in said bore and to open position upon upstream longitudinal movement thereof in said bore, connecting means coupling said valve seat members loosely to said ball-valve member for unitary longitudinal movement thereof within said bore, an external annular flange formed on the downstream valve seat member and slidably and sealingly engaging said enlarged bore mid-portion to form a variable capacity chamber between the enlarged bore mid-portion and the downstream valve seat member, said chamber having a cross-sectional area substantially greater than the cross-sectional area of the restricted upstream end of said bore, a first passage in said valve body from said chamber to said bore upstream of said ball-valve member, a second passage in said valve body from said chamber to the exterior of said valve body, selectively operable valve means for simultaneously opening said first passage and closing said second passage or for simultaneously closing said first passage and opening said second passage, and third passage means fluidly communicating the enlarged bore mid-portion between said valve seat members with the downstream end of said bore at all times during opening and closing movement of said ball-valve member.

7. A ball-type surface safety valve comprising a valve body provided with a straight bore therethrough having upstream and downstream restricted diameter portions on either side of an enlarged diameter portion, a pair of upstream and downstream oppositely facing and spaced apart tubular valve seat members each longitudinally sealingly slidable in one of said bore end portions and projecting into said enlarged bore mid-portion, a ball-valve member having an opening therethrough and seatable between said seats for opening and closing said bore upon the rotation thereof about an axis transverse to the opening therethrough, interengaging cam slots on one and cam lugs on the other of the opposite sides of said ball-valve member and the valve body for causing rotation of said ball-valve member to closed position upon downstream longitudinal movement thereof in said bore and to open position upon upstream longitudinal movement thereof in said bore, connecting means coupling said valve seat members loosely to said ball-valve member for unitary longitudinal movement thereof within said bore, an external annular flange formed on the downstream valve seat member and slidably and sealingly engaging said enlarged bore mid-portion to form a variable capacity chamber between the enlarged bore mid-portion and the downstream valve seat member, said chamber having a cross-sectional area substantially greater than the cross-sectional area of the restricted upstream end of said bore, spring means in said valve body biasing said downstream valve seat member in an upstream direction, a first passage in said valve body from said chamber to said bore upstream of said ball-valve member, a second passage in said valve body from said chamber to the exterior of said valve body, selectively operable valve means for simultaneously opening said first passage and closing said second passage or for simultaneously closing said first passage and opening said second passage, and third passage means through said ball-valve member for fluidly communicating the enlarged bore mid-portion between said valve seat members with the downstream end of said bore at all times during opening and closing movement of said ball-valve member.

8. A ball-type surface safety valve comprising a valve body provided with a straight bore therethrough having upstream and downstream restricted diameter portions on either side of an enlarged diameter portion, a pair of upstream and downstream oppositely facing and spaced apart tubular valve seat members each longitudinally slidable in one of said bore end portions and projecting into said enlarged bore mid-portion, a ball-valve member having an opening therethrough and seatable between said seats for opening and closing said bore upon the rotation thereof about an axis transverse to the opening therethrough, interengaging cam slots on one and cam lugs on the other of the opposite sides of said ball-valve member and the valve body for causing rotation of said ball-valve member to closed position upon downstream longitudinal movement thereof in said bore and to open position upon upstream longitudinal movement thereof in said bore, connecting means coupling said valve seat members for unitary longitudinal movement thereof within said bore, an external annular flange formed on the downstream valve seat member in sliding engagement with said enlarged bore mid-portion to form a variable capacity chamber between the enlarged bore mid-portion and the downstream valve seat member, resilient means in said valve body biasing said downstream valve seat member in an upstream direction, a first passage in said valve body from said chamber to the upstream end of said bore, a second passage in said valve body from said chamber to the exterior of said valve body, a check valve seat in said first passage facing upstream, a check valve in said first passage seatable upon said check valve seat, a pressure-responsive pilot valve mounted on said valve body and having a pilot valve member responsive to the upstream pressure in said valve body bore, to move from a first to a second position in response to a predetermined variation of upstream pressure from a predetermined value, said pilot valve member being in engagement with said check valve to displace the check valve from said check valve seat to open said first passage and said pilot valve member closing said second passage when said pilot valve is in its first position, said pilot valve member being out of engagement with said check valve member and opening said second passage when said pilot valve is in its second position, and third passage means fluidly communicating the enlarged bore mid-portion between said valve seat members with the downstream end of said bore at all times during opening and closing movement of said ball-valve member.

9. A ball-type surface safety valve comprising a valve body provided with a straight bore therethrough having upstream and downstream restricted diameter portions on either side of an enlarged diameter portion, a pair of upstream and downstream oppositely facing and spaced apart tubular valve seat members each longitudinally sealingly slidable in one of said bore end portions and projecting into said enlarged bore mid-portion, a ball-valve member having an opening therethrough and seatable between said seats for opening and closing said bore upon the rotation thereof about an axis transverse to the opening therethrough, interengaging cam slots on one and cam lugs on the other of the opposite sides of said ball-valve member and the valve body for causing rotation of said ball-valve member to closed position upon downstream longitudinal movement thereof in said bore and to open position upon upstream longitudinal movement thereof in said bore, connecting means coupling said valve seat members loosely to said ball-valve member for unitary longitudinal movement thereof within said bore, an external annular flange formed on the downstream valve seat member and slidably and sealingly engaging said enlarged bore mid-portion to form a variable capacity chamber between the enlarged bore mid-portion and the downstream valve seat member, said chamber having a cross-sectional area substantially greater than the cross-sectional area of the restricted upstream end of said bore, spring means in said valve body biasing said downstream valve seat member in an upstream direction, a first passage in said valve body from said chamber to the upstream end of said bore, a second passage in said valve body from said chamber to the exterior of said valve body, a check valve seat in said first passage facing upstream, a check valve in said first passage seatable upon said check valve seat, a pressure-responsive pilot valve mounted on said valve body and having a pilot valve member responsive to the upstream pressure in said valve body bore to move from a first to a second position in response to a predetermined variation of upstream pressure from a predetermined value, said pilot valve member being in engagement with said check valve to displace the check valve from said check valve seat to open said first passage and said pilot valve member closing said second passage when said pilot valve is in its first position, said pilot valve member being out of engagement with said check valve member and opening said second passage when said pilot valve is in its second position, and third passage means through said ball-valve member for fluidly communicating the enlarged bore mid-portion between said valve seat members with the downstream end of said bore at all times during opening and closing movement of said ball-valve member.

10. A ball-type surface safety valve comprising a valve body provided with a bore therethrough, a ball-valve member disposed in said bore and having an opening therethrough for opening and closing said bore upon the rotation of said ball-valve member about an axis transverse to the opening therethrough, cam slots formed on opposite sides of said ball-valve member, cam lugs formed on said valve body and interengaging with said cam slots for causing rotation of said ball-valve member to closed position upon longitudinal movement thereof in one direction in said bore and to open position upon longitudinal movement thereof in an opposite direction within said bore, an axially rotatable indicator member disposed in one of said cam lugs and having a portion thereof visible from the exterior of said valve body, an elongated indicator groove formed in the cam slot engaged by said one cam lug, said indicator member having a flattened portion projecting from said cam lug into said indicator groove whereby combined longitudinal and rotational movement of said ball-valve member will cause a rotational movement of said indicator member portion.

11. A ball-type surface safety valve comprising a valve body provided with a straight bore therethrough having upstream and downstream restricted diameter portions on either side of an enlarged diameter mid-portion, a pair of upstream and downstream oppositely facing and spaced apart tubular valve seat members each longitudinally sealingly slidable in one of said bore end portions and projecting into said enlarged bore mid-portion, a ball-valve member having an opening therethrough and seatable between said seats for opening and closing said bore upon the rotation thereof about an axis transverse to the opening therethrough, cam slots formed on opposite sides of said ball-valve member, cam lugs formed on said valve body and interengaging with said cam slots for causing rotation of said ball-valve member to closed position upon downstream longitudinal movement thereof in said bore and to open position upon upstream movement thereof within said bore, an axially rotatable indicator member disposed in one of said cam lugs and having a portion thereof visible from the exterior of said valve body, an elongated indicator groove formed in the cam slot engaged by said one cam lug, said indicator member having a flattened portion projecting from said cam lug into said indicator groove whereby longitudinal and rotational movement of said ball-valve member will cause a corresponding rotational movement of said indicator member portion.

12. A ball-type surface safety valve comprising a valve body provided with a straight bore therethrough having upstream and downstream restricted diameter portions on either side of an enalrged diameter mid-portion, a pair of upstream and downstream oppositely facing and spaced apart tubular valve seat members each longitudinally slidable in one of said bore end portions and projecting into said enlarged bore mid-portion, a ball-valve member having an opening therethrough and seatable between said seats for opening and closing said bore upon the rotation thereof about an axis transverse to the opening therethrough, cam slots formed on opposite sides of said ball-valve member, cam lugs formed on said valve body and interengaging with said cam slots for causing rotation of said ball-valve member to closed position upon downstream longitudinal movement thereof in said bore and to open position upon upstream movement thereof within said bore, an axially rotatable indicator member disposed in one of said cam lugs and having a portion thereof visible from the exterior of said valve body, an elongated indicator groove formed in the cam slot engaged by said one cam lug, said indicator member having a flattened portion projecting from said cam lug into said indicator groove whereby longitudinal and rotational movement of said ball-valve member will cause a corresponding rotational movement of said indicator member portion, connecting means coupling said valve seat members loosely to said ball-valve member for unitary longitudinal movement thereof within said bore, an external annular flange formed on the downstream valve seat member in sliding engagement with said enlarged bore mid-portion to form a variable capacity chamber between the enlarged bore mid-portion and the downstream valve seat member, resilient means in said valve body biasing said downstream valve seat member in an upstream direction, means including a valve to selectively fluidly communicate said chamber to the upstream end of said bore or to atmosphere and means fluidly communicating the enlarged bore mid-portion between said valve seat members with the downstream end of said bore at all times during opening and closing movement of said ball-valve member.

References Cited in the file of this patent

UNITED STATES PATENTS

| | | |
|---|---|---|
| 2,676,611 | Page | Apr. 27, 1954 |
| 2,708,563 | Backman | May 17, 1955 |
| 2,786,535 | Boer | Mar. 26, 1957 |
| 2,902,046 | Dollison | Sept. 1, 1959 |

FOREIGN PATENTS

| | | |
|---|---|---|
| 762,219 | Great Britain | Nov. 28, 1956 |